United States Patent [19]

Jaffe et al.

[11] Patent Number: 5,018,211

[45] Date of Patent: May 21, 1991

[54] SYSTEM FOR DETECTING AND ANALYZING ROUNDED OBJECTS

[75] Inventors: Robert S. Jaffe, Shenorock; Jon R. Mandeville, Yorktown Heights, both of N.Y.

[73] Assignee: International Business Machines Corp., Armonk, N.Y.

[21] Appl. No.: 264,534

[22] Filed: Oct. 31, 1988

[51] Int. Cl.$^5$ .......................... G06K 9/00; G06K 9/48; G06K 9/46; G01B 11/24
[52] U.S. Cl. ......................................... 382/8; 382/22; 382/25; 382/55; 358/107; 356/376
[58] Field of Search .................. 382/8, 21, 22, 25, 28, 382/55; 364/546, 490; 356/241, 384, 376; 358/107

[56] References Cited

U.S. PATENT DOCUMENTS

| | | | |
|---|---|---|---|
| 4,539,704 | 9/1985 | Pastor | 382/55 |
| 4,630,309 | 12/1986 | Karow | 382/21 |
| 4,853,967 | 8/1989 | Mandeville | 382/8 |

Primary Examiner—David K. Moore
Assistant Examiner—Michael R. Cammarata
Attorney, Agent, or Firm—Perman & Green

[57] ABSTRACT

A system is described which determines the characteristics of a substantially rounded feature, such as via hole in a printed circuit board. The system includes an image scanner for providing a serial flow of a raster scan image of pixels which represent the rounded feature. Tangent detecting circuits are further provided which select groups (i.e., neighborhoods) of pixels from the scan image, each group including pixels clustered about a plurality of chosen azimuths and adjacent to a tangent to a boundary of the rounded feature. Processing circuits are further provided to trim each selected group of pixels to eliminate pixels not lying on the tangent line. The pixels which remain after the trim operation are representative of the limits (e.g., diameter, radius, etc.) of the rounded feature and enable an analyzing circuit to determine the characteristics of the rounded feature by examining the relationships between the tangent line pixels.

A second system is described which reduces the apparatus required for trimming the selected pixel groups. A tangent segment is fed into a plurality of parallel networks which initially identify right and left shoulders of the tangent segment. The identified shoulders are expanded and used as a mask on the original tangent segment to disconnect a central plateau thereof from its next lower and non-central plateaus. Subsequent trimming enables the central plateau to be identified.

10 Claims, 19 Drawing Sheets

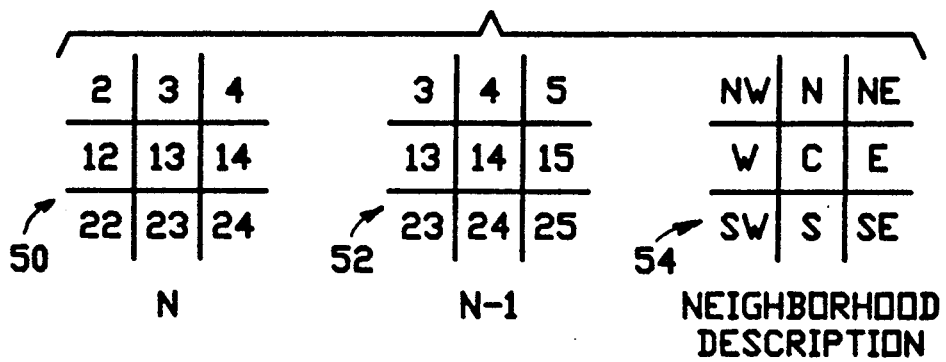
FIG.1
FIG.2
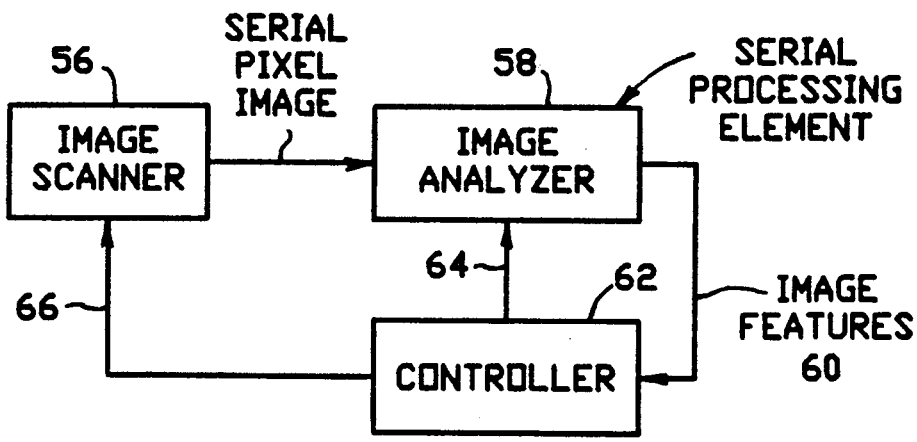
FIG.3

FIG.4 PROCESSING ELEMENT
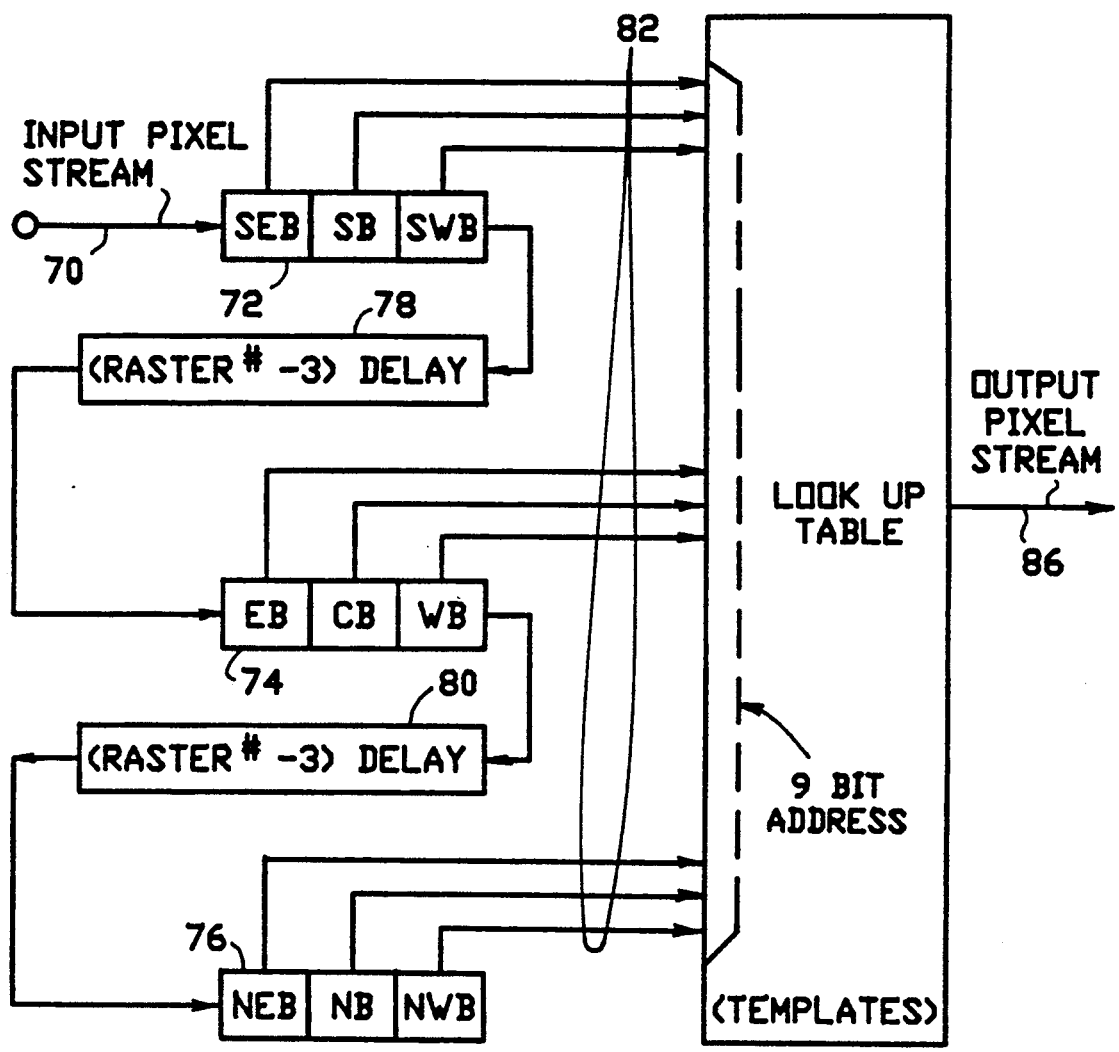
FIG.5
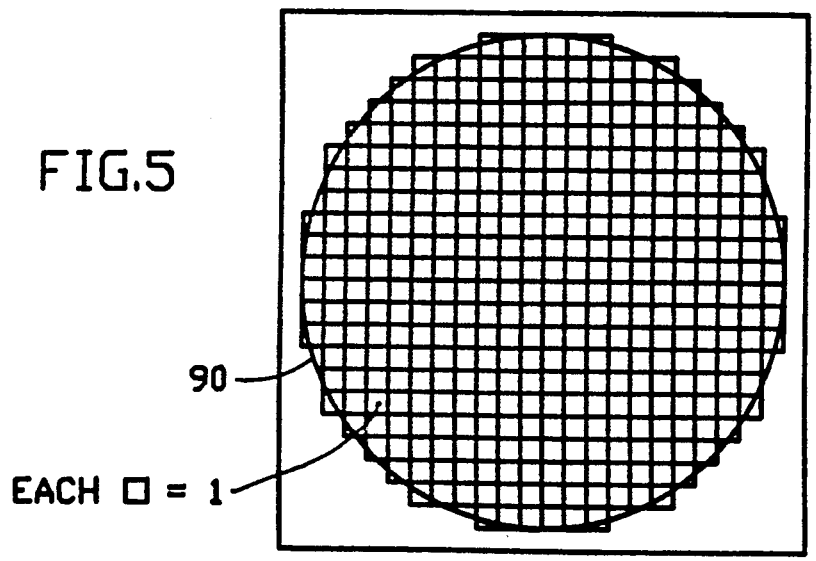

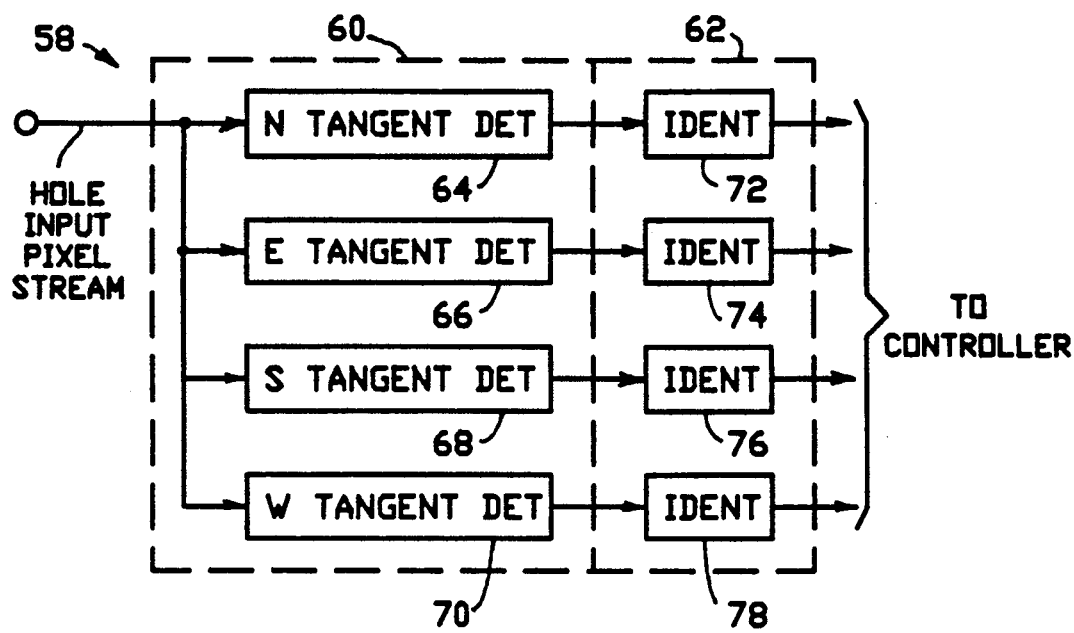
FIG.6
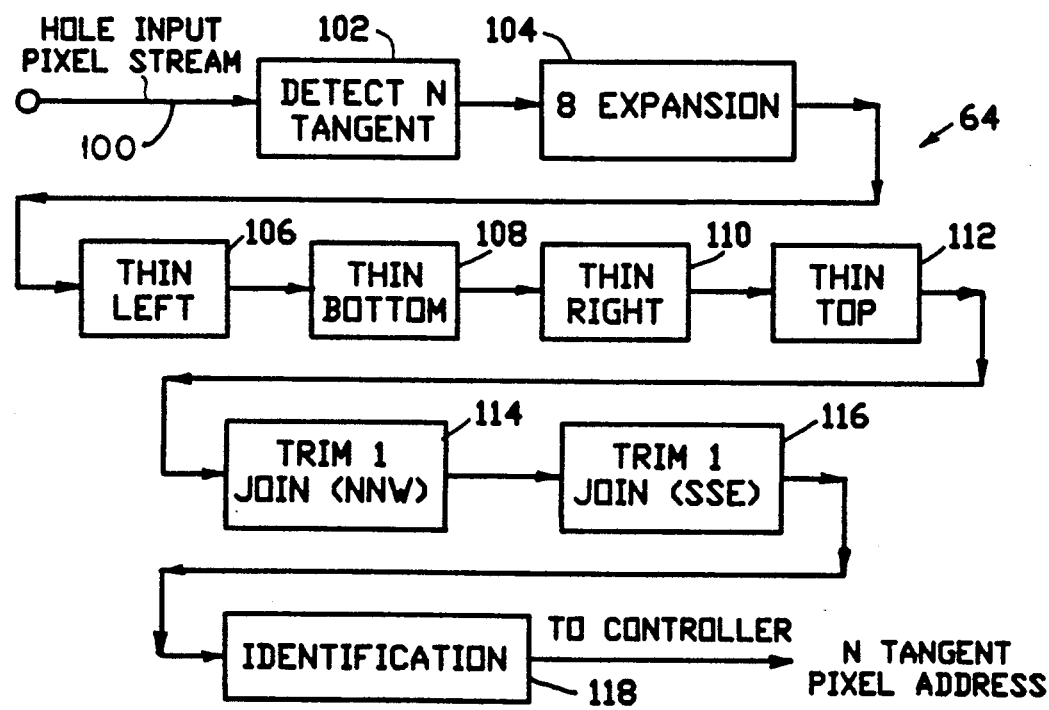
FIG.7 NORTH TANGENT DETECTOR

FIG.12

SYMBOL MEANING

Ot = OUTPUT

X = BIT IS SET TO 1

0 = BIT IS SET TO 0

− = BIT CAN BE EITHER 1 OR 0

∗ = BIT MAY BE 1 OR 0 BUT AT LEAST ONE OF '∗' BITS MUST BE SET TO 1

# = ONE OR MORE OF SPECIFIED BITS MAY BE SET TO 1, THE NUMBER OF WHICH MUST BE COUNTED AND COMPARED TO SOME NUMBER.

"!=" = NOT EQUAL

C = COUNT

*NTAN - Detect Structural North Tangents*

Ot = CB AND SWB AND SB AND SEB AND (NOT (NEB OR NB OR NWB))

*STAN - Detect Structural South Tangents*

Ot = CB AND NEB AND NB AND NWB AND (NOT (SWB OR SB OR SEB))

*ETAN - Detect Structural East Tangents*

Ot = CB AND WB AND SWB AND NWB AND (NOT (SEB OR EB OR NEB))

*WTAN - Detect Structural West Tangents*

Ot = CB AND SEB AND EB AND NEB AND (NOT (WB OR SWB OR NWB))

EXPNF - Expansion (8)

Ot= (CB OR WB OR SWB OR SB OR SEB OR EB OR NEB
OR NB OR NWB)

EXP4NF - 4 Expansion

LEFTHP - Thin From the Left

```
        Ot= CB AND NOT (
(SB AND EB AND (NOT (WB OR NB OR NWB))) OR
(EB AND NB AND (NOT (WB OR SWB OR SB))) OR
(SB AND EB AND NB AND (NOT WB)) OR
(SEB AND (NOT (WB OR SWB OR SB OR EB OR NEB OR NB OR NWB))) OR
(EB AND (NOT (WB OR SWB OR SB OR NB OR NWB)))
)
```

```
        — ] — ] —
        ---]---]---
        — ] X ] —     AND NOT
        ---]---]---
        — ] — ] —
```

BOTTHP - Thin From the Bottom

```
    Ot= CB AND NOT (
(EB AND NB AND (NOT (WB OR SWB OR SB))) OR
(WB AND NB AND (NOT (SB OR SEB OR EB))) OR
(WB AND EB AND NB AND (NOT SB)) OR
(NEB AND (NOT (WB OR SWB OR SB OR SEB OR EB OR NB OR NWB))) OR
(NB AND (NOT (WB OR SWB OR SB OR SEB OR EB)))
)

— ] — ] —
            ---]---]---
            — ] X ] —        AND NOT
            ---]---]---
            — ] — ] —

*RITTHP - Thin From the Right*

```
O← = CB AND NOT (
(WB AND NB AND (NOT (SB OR SEB OR EB))) OR
(WB AND SB AND (NOT (EB OR NEB OR NB))) OR
(WB AND SB AND NB AND (NOT EB)) OR
(NWB AND (NOT (WB OR SWB OR SB OR SEB OR EB OR NEB OR NB))) OR
(WB AND (NOT (SB OR SEB OR EB OR NEB OR NB)))
)
```

```
     — ] ] —
     ---]---]---
     — ] X ] —      AND NOT
     ---]---]---
     — ] — ] —
```

*TOPTHP - Thin From the Top*

```
Ot= CB AND NOT (
(WB AND SB AND (NOT (EB OR NEB OR NB))) OR
(SB AND EB AND (NOT (NB OR NWB OR WB))) OR
(WB AND SB AND EB AND (NOT NB)) OR
(SWB AND (NOT (SB OR SEB OR EB OR NEB OR NB OR NWB OR WB))) OR
(SB AND (NOT (EB OR NEB OR NB OR NWB OR WB)))
)
```

```
       — ] — ] —
       ---]---]---
       — ] X ] —    AND NOT
       ---]---]---
       — ] — ] —

TRMP0 - Trim 1-Joins from NNW

0← = (CB AND
(((WB+SWB+SB+SEB+EB+NEB+NB+NWB) != 1) OR ((WB+NEB+NB+NWB) == 0))

```
        ╭─202              ╭─204                        ╭─206
   -] - ] -             ] # ] # ] #                   # ] # ] #              ]
   ---]---]---          ] ---]---]---                 ---]---]---            ]
   -] X ] —    AND  ] # ] — ] #   (C != 1)  OR   # ] — ] —   (C == 0)]
   ---]---]---          ] ---]---]---                 ---]---]---            ]
   -] - ] -             ] # ] # ] #                   -] - ] -               ]
```

FIG. 16b

TRMP1 - Trim 1-Joins from SSE

0← = (CB AND
(((WB+SWB+SB+SEB+EB+NEB+NB+NWB) != 1) OR ((SWB+SB+SEB+EB) == 0))

```
   -] - ] -             ] # ] # ] #                   - ] - ] -              ]
   ---]---]---          ] ---]---]---                 ---]---]---            ]
   -] X ] —    AND  ] # ] — ] #   (C != 1)  OR   -] — ] #   (C == 0)]
   ---]---]---          ] ---]---]---                 ---]---]---            ]
   -] - ] -             ] # ] # ] #                   # ] # ] #              ]
```

FIG. 17

*JOIN0 - Detect 0-Joins*

Ot= (CB AND (NOT (WB OR SWB OR SB OR SEB OR EB OR NEB OR NB OR NWB)) )

*IDENTNF - Center Bit Identity Function*

Ot= CB

```
   - ] - ] -
   ---]---]---
   - ] X ] -
   ---]---]---
   - ] - ] -
```

SW2D - South West 2 Dilate      FIG.19a

Ot= (CB OR EB OR NEB OR NB)

```
— ] * ] *
---]---]---
— ] * ] *
---]---]---
— ] — ] —
```

SE2D - South East 2 Dilate      FIG.19b

Ot= (CB OR WB OR NB OR NWB)

```
* ] * ] —
---]---]---
* ] * ] —
---]---]---
— ] — ] —
```

NW2D - North West 2 Dilate      FIG.19c

Ot= (CB OR SB OR SEB OR EB)

```
— ] — ] —
---]---]---
— ] * ] *
---]---]---
— ] * ] *
```

NE2D - North East 2 Dilate      FIG.19d

Ot= (CB OR WB OR SWB OR SB)

```
— ] — ] —
---]---]---
* ] * ] —
---]---]---
* ] * ] —
```

NLS - North Left Step Template  FIG. 20a

Ot= (CB AND NB AND (NOT EB)) OR
(CB AND NEB AND (NOT (NB OR EB))) )

```
-] X ]-         -] O ] X
---]---]---     ---]---]---
-] X ] O   OR   -] X ] O
---]---]---     ---]---]---
-] -] -         -] -] -
```

NRS - North Right Step Template  FIG. 20b

Ot= (CB AND NB AND (NOT WB)) OR
(CB AND NWB AND (NOT (WB OR NB))) )

```
-] X ]-         X ] O ]-
---]---]---     ---]---]---
O ] X ]-   OR   O ] X ]-
---]---]---     ---]---]---
-] -] -         -] -] -
```

SLS - South Left Step Template  FIG. 20c

Ot= (CB AND SB and (NOT EB)) OR
(CB AND SEB AND (NOT (SB OR EB))) )

```
-] -] -         -] -] -
---]---]---     ---]---]---
-] X ] O   OR   -] X ] O
---]---]---     ---]---]---
-] X ]-         -] O ] X
```

SRS - South Right Step Template  FIG. 20d

Ot= (CB AND SB AND (NOT WB)) OR
(CB AND SWB AND (NOT (SB OR WB))) )

```
-] -] -         -] -] -
---]---]---     ---]---]---
O ] X ]-   OR   O ] X ]-
---]---]---     ---]---]---
-] X ]-         X ] O ]-
```

WTS - West Top Step Template     FIG. 20e

Ot= (CB AND WB AND (NOT SB)) OR
    (CB AND SWB AND (NOT (WB OR SB)) )

```
— ] — ] —        — ] — ] —
---]---]---      ---]---]---
 X ] X ] —  OR   0 ] X ] —
---]---]---      ---]---]---
— ] 0 ] —        X ] 0 ] —
```

WBS - West Bottom Step Template     FIG. 20f

Ot= (CB AND WB AND (NOT NB)) OR
    (CB AND NWB AND (NOT (WB OR NB) )

```
— ] 0 ] —        X ] 0 ] —
---]---]---      ---]---]---
 X ] X ] —  OR   0 ] X ] —
---]---]---      ---]---]---
— ] — ] —        — ] — ] —
```

ETS - East Top Step Template     FIG. 20g

Ot= (CB AND EB AND (NOT SB)) OR
    (CB AND SEB AND (NOT (SB OR EB)) )

```
— ] — ] —        — ] — ] —
---]---]---      ---]---]---
— ] X ] X   OR   — ] X ] 0
---]---]---      ---]---]---
— ] 0 ] —        — ] 0 ] X
```

EBS - East Bottom Step Template     FIG. 20h

Ot= (CB AND EB AND (NOT NB)) OR
    (CB AND NEB AND (NOT (NB OR EB)) )

```
— ] 0 ] —        — ] 0 ] X
---]---]---      ---]---]---
— ] X ] X   OR   — ] X ] 0
---]---]---      ---]---]---
— ] — ] —        — ] — ] —
```

SYSTEM FOR DETECTING AND ANALYZING ROUNDED OBJECTS

FIELD OF THE INVENTION

This invention relates to automatic image processing and more particularly, to a system for automatic image processing which enables features of rounded objects to be analyzed and characterized.

DESCRIPTION OF THE PRIOR ART

Electronic packaging technologies are evolving towards more densely populated boards and/or substrates. As a result, the packages have become more costly, not only to produce but also to replace in the field. Quality control methods have been pushed to keep pace with the trend towards larger circuit areas, more complex circuits and smaller circuit features. In that regard, printed circuits on each layer must be carefully inspected before that layer is used to make up a composite of layers. Although electrical testing can detect some defect types, only human visual (or automated optical) inspection can reliably detect many defects. Human visual inspection is both labor intensive and costly.

A variety of approaches for automated optical inspection of printed circuits (and other entities) have been reported over the last decade. Those approaches typically use an analog subsystem for image acquisition and a digital subsystem for image analysis and overall system control. Such systems often do not analyze grey scale analog images; instead, most methods are based on the analysis of discrete binary images generated by sampling analog images on a regular grid and thresholding the results to a 0 or a 1. Discrete binary images are thus made up of a matrix whose elements (pixels) are 0 or 1.

Most proposed methods for the analysis of binary images are variations of either a reference-comparison or generic-property approach. In general, the reference-comparison approach uses a complete knowledge of the circuit under test whereas the generic-property approach uses the knowledge of properties common to a circuit family but not knowledge of a specific circuit under test.

There are two types of reference comparisons. The simpler approach involves some kind of direct image comparison, e.g., boolean exclusive-or comparison between pixels in a test image and pixels in an idealized reference image. Somewhat more sophisticated approaches involve recognition of circuit features in the test image (pads, corners, etc.) followed by a comparison against a reference.

The generic-property approach also takes two forms. One is based the notion that idealized circuit features are simple, regular geometric shapes whereas defects typically are not. With this approach the system looks for unexpected irregular features. The second form is based on directly verifying design rules, e.g., trace width, feature spacing, pad locations and size, etc. In both forms, defects are usually detected by using strictly local neighborhood processing throughout the test image.

Some specific examples of the above-described analysis techniques are found in prior art patents. Broadbent, Jr, et al., in U.S. Pat. No. 4,555,798, describe an automatic inspection system wherein a digital representation of the item being inspected is first stored. A signal processor then inspects, measures and performs various comparison tests on the stored digital representation. A smoothness checker measures the local radius of curvature of holes at several places and to detect defects, compares the measurements to predetermined curvature limits. An area checker measures the area of a hole and compares it to predetermined limits. A diameter checker measures the diameter of the hole in two dimensions and compares it to predetermined diameter limits.

For low-throughput systems, the Broadbent, Jr. et al system is effective and provides the desired level of inspection capability. However, if substantial throughputs are required of reasonably complex items to be inspected, the performance capability of the Broadbent, Jr. et al. type system is rapidly out-distanced by the product flow. Bishop et al. in U.S. Pat. No. 4,589,140, stores digital information from optical scans of objects at different magnifications but with substantially the same field of view and compares the information so obtained with stored mask information. This system, too, has similar speed limitations as the Broadbent, Jr. et al. system.

Recently, image processing architectures have been proposed and implemented which employ pipelined operations on an acquired image. In other words, the image, in lieu of being stored, is converted to a digital raster representation of 1's and 0's and is serially fed through the processing system in a pipeline fashion. The insertion of appropriate logical processing subsystems in the pipeline enables aspects of the image to be rapidly isolated and analyzed. Such architectures are described by Sternberg in "Parallel Architectures For Image Processing", Proceedings IEEE., Compsac, 1979 and "Biomedical Image Processing", Sternberg, "Computer", pages 22–34, January, 1983. A computing system designed so as to enable ready implementation of pipeline image processing has been developed by the IBM Corporation and is called "Morphic Image Transform Engine (MITE) and is described in a co-pending U.S. patent application Ser. No. 07/150,000, entitled Configurable Parallel Pipeline Image Processing System, filed Feb. 5, 1988 and assigned to the same assignee as is this application The invention herein described may be implemented on the MITE system.

A method of analysis employed by the MITE system in analyzing images has been described by an inventor hereto, Jon R. Mandeville, in "Novel Method For Analysis Of Printed Circuit Images" IBM Journal Research and Development, Vol. 29, No. 1, pages 73–86, January 1985. It has been well demonstrated that pipeline processing machines such as the MITE, when combined with efficient algorithms for the analysis of images, perform such analysis in a much more rapid manner than other similar sized computing assemblies.

Accordingly, it is an object of this invention to provide a system for analyzing rounded features of an image.

It is still another object of this invention to provide an image processing system which employs pipeline style processing and is adapted to analyze rounded features in an image to determine their characteristics.

It is still another object of this invention to provide a pipeline image analysis system which employs a minimum number of processing stages to accomplish its analysis function.

SUMMARY OF THE INVENTION

A system is described that determines the characteristics of a substantially rounded feature, such as a via-hole in a printed circuit board. The system includes means for providing a serial flow of a raster scan image of pixels which represents the rounded feature. Means. are further provided which select groups (i.e., neighborhoods) of pixels from the scan image, each group including pixels clustered, about a plurality of chosen azimuths and lying about a line which is substantially tangent to a boundary of the rounded feature. Means are further .provided to trim each selected group of pixels to eliminate pixels not lying on the tangent line. The pixels which remain after the trim operation are representative of the limits (e.g., diameter, radius, etc.) of the rounded feature and enable analyzing means to determine the characteristics of the rounded feature by examining the relationships between the tangent line pixels.

A somewhat more sophisticated system is described which reduces the apparatus required for trimming the selected pixel groups. A tangent segment is fed into a plurality of parallel networks which initially identify right and left shoulders of the tangent segment. The identified ends are expanded and used as a mask to disconnect the central plateau of the original tangent segment from its next lower and non-central plateaus. Subsequent trimming enables the central plateau to be identified.

DESCRIPTION OF THE DRAWINGS

FIG. 1 is a schematic showing of a raster scan image of pixels having representatively numbered pixel positions.

FIG. 2 is a schematic showing of a plurality of "8" neighborhoods of pixels along with a generic 8-neighborhood description.

FIG. 3 is a high level block diagram of a system which implements the invention.

FIG. 4 is a block diagram of a processing element which forms the main logic operating unit within the invention.

FIG. 5 is a raster scan image of a via-hole showing the hole's north, east, south and west extremities.

FIG. 6 is a high level block diagram of a first preferred embodiment of the invention.

FIG. 7 is a more detailed block diagram of a tangent detector constructed in accordance with the invention.

FIG. 12 shows definitions of the symbols used in FIGS. 13–20.

FIGS. 13a–13d illustrate the logic equations and templates used to detect north, south, east and west pixel tangents.

FIGS. 14a and 14b illustrate logic equations and templates used to provide both 8-neighborhood and 4 neighborhood expansions.

FIGS. 15a–15d illustrate logic equations and templates employed to thin or (skeletonize) pixel neighborhoods.

FIGS. 16a and 16b illustrate logic equations and templates employed to remove or trim adjoining pixels from connected pixels.

FIG. 17 illustrates a logic equation and template employed to identify pixels which have no other pixels adjacent thereto.

FIG. 18 illustrates a logic equation and template which is employed when a delay function is to be employed.

FIGS. 19a–19d illustrate logic equations and templates which are employed when individual pixels are to be "dilated" to add additional adjacent pixels to a defined region.

FIGS. 20a–20h illustrate logic equations and templates employed to identify shoulder areas adjacent to tangents.

DETAILED DESCRIPTION OF THE INVENTION

Figure 8A:
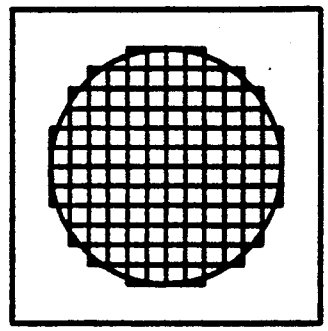
FIGS. 8a–8e illustrate a pixel image at various stages of the operation of the system of FIG. 7.

Referring now to FIG. 1, a schematic of a raster scan is shown wherein each line of the scan is comprised of 10 pixel positions, with each succeeding scan line numbered sequentially. The pixel positions are numbered sequentially starting at the upper left and ending at the lower right. While there is shown only 10 horizontal scan pixel positions, it is common to have from 256 to 640 individual pixel positions per scan line and up to 512 scan lines. Of course, there are higher definition systems wherein both the number of pixels per scan line and the number of scan lines are greatly increased.

During the operation of the image analysis system of this invention, pixels contained within the raster scan image are serially streamed through the various stages of the system and, at each stage, a "neighborhood" of pixels is operated upon by comparing it to a template or group of templates which define the logic function to be carried out. Referring to FIG. 2, an "8-neighborhood" 50 of pixels clustered about center pixel 13 is shown and comprises pixels 2, 3, and 4 from scan line 0; pixels 12 and 14 from scan line 1, and pixels 22, 23 and 24 from scan line 2 (all shown in FIG. 1). During a next clock cycle, each pixel is incremented by one position and an n+1 neighborhood 52 is created. Then, logical operations may be performed on the 8-neighborhood associated with pixel 14. The generic description of each neighborhood pixel is as shown at 54 in FIG. 2 with each of the pixels (other than center pixel C) being denoted by the points of the compass.

In this invention, essentially black and white images are utilized, and each pixel is represented by a logical 1 or 0 with a logical 1 indicating a dark area of the image and a logical 0 indicating a light area of the image.

Turning now to FIG. 3, a high level block diagram of the image analysis system is shown. Image scanner 56 provides a pixel image of the device, circuit board or other feature being examined. If via-holes are being examined for their position and size, image scanner 56 will provide an image wherein the pixel points inside the via-hole have "1" indications and the surrounding areas have "0" indications. Essentially a "1" indication indicates the darker or inner areas of the via-hole and a "0" indicates a plane which is contiguous with the outside of the via-hole.

The serial pixel image output from image scanner 56 is fed to image analyzer 58 which is comprised of a plurality of processing units, to be hereinafter described. Image analyzer 58 operates to isolate and reduce particular image features and provides a series of identified pixels on line 60 to controller 62. For instance, if image analyzer 58 is analyzing a via-hole configuration, it will, on line 60, provide a series of 4 or more pixels which identify the north, east, south and western tangents of the via-hole, with each pixel identified as to a specific address in the image scan. Controller 62 is then able, by using the addresses of the identified azimuthal pixels, to calculate the diameter of the via-hole, determine its placement in relation to other known features on the circuit board, and generally examine the contours of the hole, since it is now able to precisely identify the expected circumference of the hole and determine whether it varies from a predetermined defined shape. Controller 62 also controls the operation of image analyzer 58 via line 64. For instance, controller 62 provides clocking signals to image analyzer 58 which enables the serial pixel image to be synchronously clocked therethrough, so that each pixel 8-neighborhood is sequentially acted upon by the various serial processing units within image analyzer 58. Controller 62 is also employed, in the well known manner, to control the operation of image scanner 56 via line 66.

Turning now to FIG. 4, a block diagram of a processing element is illustrated and is the basic logical element utilized throughout image analyzer 58. The structure of the processing element shown in FIG. 4 is known in the prior art.

A serial pixel image appears on input line 70 in the form of a serial stream of pixels arranged in increasing time order. The pixel stream passes through a series of three position, serial shift registers 72, 74, and 76. The output from serial shift register 72 is fed to the input of shift register 74 via a delay circuit 78. Delay circuit 78 may be a serial shift register having a number of pixel positions equal to the number of pixels in a raster scan line, less 3. (There are, of course, other ways of implementing delay circuit 78 which are well known to those skilled in the art). In similar fashion, the output of serial shift register 74 is connected to the input of serial shift register 76 via delay circuit 80. The structure of delay circuit 80 is identical to that of delay circuit 78. During each clock time, the bit positions in serial shift registers 72, 74 and 76 have their respective outputs 82 provided in parallel to look up table 84. Look up table 84 is essentially a random access memory which employs the bit indications on lines 82 as a nine bit address into its memory. The memory is configured to provide, for a particular 8-neighborhood input arrangement, an output bit consistent with a predetermined template. The template is pre-configured to provide a particular 8-neighborhood output in accordance with a desired function (e.g., "expansion", "contraction", "thinning", etc.).

At a given clock time, a pixel bit (1 or 0) will be inserted into the first stage of serial shift register 72. At the same time, a bit will be shifted out of the 3rd stage of serial shift register 72 and inserted into delay circuit 78. At the other end of delay circuit 87, a bit will emerge which will be inserted into the first stage of serial shift register 74 etc. As can be seen, the result of this action is that a new 8-neighborhood is created in shift registers 72, 74 and 76 each time a new pixel bit appears on input line 70.

In lieu of each 8-neighborhood being arranged as shown at 54 in FIG. 2, it is inverted and reversed by the circuit of FIG. 4 so that the northwestern bit of the neighborhood appears in the neighborhood's lower right corner with the southeastern bit appearing in the upper left hand corner. The western bit appears in the rightmost position of the neighborhood whereas the eastern bit appears in the leftmost position. Hereinbelow, reference will be made to a variety of templates which control the logical operation of each processing element. Each template is illustrated in accordance with the orientation of bits shown in FIG. 2 (and not FIG. 4).

As stated above, each time a new 8-neighborhood occurs in shift registers 72, 74 and 76, a 9 bit address appears on input lines 82 which is indicative of the portion of the image represented by the 8-neighborhood bit pattern. Those 9 bits operate to cause look-up table 84 to produce a single output bit, and as each new 8-neighborhood is created by the input of a new pixel on line 70, a new bit output is generated.

A preferred use for this image analysis system is in the manufacture of printed circuit boards where the characteristics of via-holes are to be checked. In FIG. 5, there is shown a schematic of a via-hole 90 which has been greatly enlarged in size. Each of the small boxes shown in FIG. 5 is indicative of a pixel having a Value equal to 1. It is to be noted that the via-hole encompasses 22 scan lines, each having a plurality of pixels which end at the circumference of the hole. For purposes of reference, the north, east, south and western azimuths of the via-hole are indicated in FIG. 5. The objective of the image analysis system is to determine the line of pixels which is tangent to one or more of the north, east, west or south extremities of the via-hole so that the hole's diameter and position can be accurately determined.

Referring now to FIG. 6, a block diagram of image analyzer 58 of FIG. 3 is shown. The two major portions of image analyzer 58 comprise the north, south, east and west tangent detector portion 60 and pixel identifier portion 62. Each of north, east, south and west tangent detectors 64, 66, 68 and 70 receives the input pixel stream. The outputs of the tangent detectors are provided in parallel to pixel position identification circuits 72, 74, 76 and 78 respectively The output from each of the pixel position identification circuits is then fed to controller 62.

Referring now to FIG. 7, the north tangent detector of FIG. 6 is shown in expanded detail. It should be understood that each of the tangent detectors is substantially identical except that each processing element's templates are modified in accordance with a particular azimuthal orientation Thus, the north tangent detector identifies and works with pixels around an azimuth drawn through the north extremity of hole 90 (see FIG. 5); the east tangent detector operates upon and identifies pixels grouped around an azimuth drawn through the eastern most extremity of hole 90, etc. The operation of FIG. 7 will be described in conjunction with exemplary pixel images shown in FIGS. 8a–8d and further, in conjunction with logic equations and templates illustrated in FIGS. 13 et sequence. Each block shown in FIG. 7 represents a processing element which includes a template defined by the title within the block.

It should be understood that prior to arriving at north tangent detector 64, the serial pixel bits are "run" through a filtering operation to eliminate and fill in unimportant details. Such filtering is well known in the art and involves both closing and opening template functions. Those functions are described in "Morphological Methods In Image and Signal Processing," Fiardina and Dougherty, Prentice Hall, copyright 1988 at pages 20–27 and elsewhere in the volume.

Before considering the operation of the system of FIG. 7, reference is made to FIG. 12 wherein is shown the definition of the symbols used with the logic equations and templates of FIGS. 13–20. Bearing in mind those definitions, reference is also made to FIGS. 13a–13d. Those FIGS. illustrate the logic equations and templates which are used to identify and isolate the north, south, east and west pixels which lie on tangents to the circumference of a via-hole under examination.

Returning to FIG. 7, an input pixel stream illustrating a via-hole is applied to input line 100 and "detect north tangent" processing element 102. A representation of the pixel scene, as it appears on line 100 is shown in FIG. 8a. As aforementioned with respect to FIG. 5, each pixel square shown in FIG. 8a is represented by a 1 in the pixel stream, whereas the areas shown external to the hole are represented by 0's in the associated pixel positions.

in FIG. 13a, the logic equation which controls the operation of the look up table in detect north tangent processing element 102 is as follows: Ot=CB and SWB and SB and SEB and (NOT(NEB or NB or NWB)) Thus, a 1 output occurs from the look up table within processing element 102 only when 1 bits are resident in the center, southwest, southern and southeast bit positions of the 8-neighborhood and 0's are present in the northeast, north and northwest portions The bits in the eastern and western positions may be either 0's or 1's and have no effect on the output.

Figure 8B:
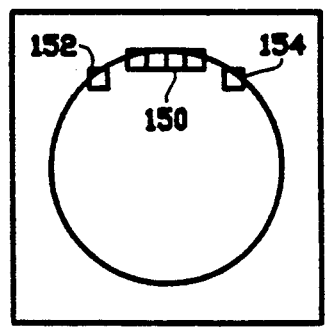

It can be seen from the template in FIG. 13a, that the illustrated 8-neighborhood bit pattern will only occur in the northern most reaches of the pixel pattern shown in FIG. 8a. Everywhere else within the pixel scene, one bits will be eliminated by processing element 102. To reiterate, when the 8-neighborhood bit pattern shown in FIG. 13a occurs, a 1 is inserted in the output pixel stream from processing element 102. When any other 8-neighborhood bit pattern is resident in the input shift registers of processing element 102 (e.g., see registers 72, 74, 76 in FIG. 4), a 0 is the resulting output. Thus, it can be seen, that for 8-neighborhoods of pixels within a via-hole, 0's will continuously be generated thereby converting all 1-bearing pixels to 0, except for those about the northern-most tangent region. The pixel scene resulting from the operation of detect north tangent processing element 102 is shown in FIG. 8b and includes not only a series of 4 pixels 150 but several disconnected pixels 152 and 154.

The next two stages of processing are employed to connect the disconnected pixels 152 and 154 to the plateau of pixels 150. This is accomplished by 8-expanding the pixel image shown in FIG. 8b to that shown in FIG. 8c so that the disjointed segments are merged. Then, the merged segments are thinned several times to achieve the single connected north tangent segment shown in FIG. 8d; and the merged segments are trimmed to result in a single north tangent segment which can then be identified as to its location (see FIG. 8e).

Figure 8C:
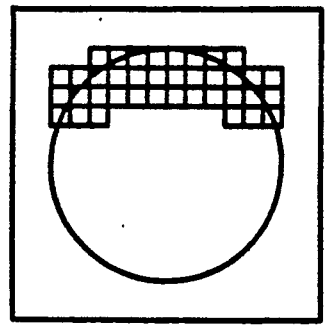

Returning to FIG. 7, the serial pixel output from processing element 102 is fed to 8-expansion processing element 104 where each pixel with a 1 1 bit has an 8-neighborhood constructed around it. The logic equation and template for the 8-expansion is shown in FIG. 14a. As can be seen from an examination of FIG. 14a, if one input pixel of the 8-neighborhood is set to 1, then the output of 8-expansion processing element 104 is a 1 bit. Thus, wherever a 1 pixel is found, there is created an 8-neighborhood about that preexisting pixel through the operation of 8 expansion unit 104. That result is shown in FIG. 8c. It should be noted that an 8 expansion creates a merging of the non-connected pixels shown in FIG. 8b and prepares the image for further processing.

The expanded pixel scene is then applied to thinning processing elements 106, 108, 110 and 112 in sequence, with element 106 trimming top oriented pixels from the scene shown in FIG. 8c; element 108 trimming pixels on the right extremity of the scene shown in FIG. 8c; element 110 thinning pixels on the bottom of the scene shown in FIG. 8c and element 112 thinning pixels on the left of the image. The logic equations and templates for the thinning functions are found in FIGS. 15a, 15b, 15c and 15d. In summary, the action of the respective thinning templates is to remove all but a sequence connected 1 pixels from the image shown in FIG. 8c, with the result being the scene shown in FIG. 8d.

Figure 8D:
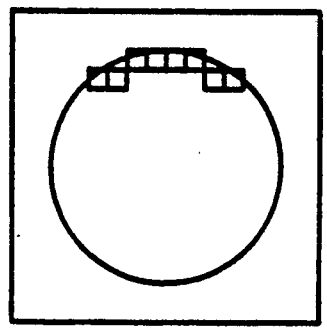

As shown in FIG. 15a, the "thin from the left" processing element 106 provides a 1 output only when the conditions of the logic equation of FIG. 15a is satisfied. The AND NOT function shown there requires that the input 8-neighborhood center bit be set to 1 and that none of the five illustrated bit patterns be simultaneously present along with the 1 center pixel Thus, for instance, when the center bit is set to 1 in the input 8-neighborhood and the remaining bit arrangement is identical to one of the five templates following the AND NOT, processing element 106 provides a 0 output to the next thinning stage (thus "thinning" the image). In essence therefore, the scene is first thinned from the left, then from the bottom in processing element 108 where it is subjected to the templates shown in FIG. 15b; then passes to the thin from the right processing element 110 where it is subjected to the templates shown in FIG. 15c; and finally, to the thin from the top processing element 112 where it is subjected to the templates shown in FIG. 15d. The result is as shown in FIG. 8d. It should also be noted that with a circle or other rounded feature that is substantially distorted, additional 8-expansions may be needed to connect the pixel sequence In such a case, additional four-sequences of thinning are also required.

Figure 8E:
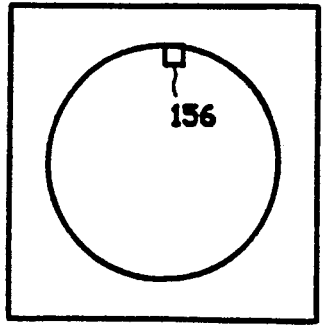

The thinned, serial image of pixels then passes to a multiplicity of trim stages 114 and 116 where the image in FIG. 8d is reduced to that in FIG. 8e. The equations and templates utilized by processing elements 114 and 116 for the trim functions are shown respectively in FIG. 16a and 16b. Trim processing elements appear in pairs and essentially nibble away pixels at either extremity of a run of pixels until there is just one left in the center. The number of trim processing elements required is dependent upon the estimated length of the sequence of thinned pixels and will vary in dependence upon the size of the image being examined.

As shown in FIG. 16a, the trim function is arranged so as to not trim all pixels remaining in a scene. This is accomplished by the illustrated AND function. In specific, if the 8-neighborhood input bit pattern indicated by template 202 occurs in conjunction with a bit pattern shown by either of templates 204 or 206, trim processing element 114 produces a 1 output. Otherwise, a 0 results. This prevents the situation from occurring where a single 1 pixel is found and trimmed.

With respect to template 206, a trim occurs if any of the west, northeast, north, or northwest bits is set to 1, along such a condition, the AND function is not satisfied and a 0 output results A similar operation occurs in trim element 116 but from the opposite direction (south southeast) with the result being that pixel 156 in FIG. 8e is isolated and fed to identification block 118. The number of trim stages is not necessarily limited to 2, but rather is determined by the size of the hole, the expected run length of pixels resulting from the thinning effort, and the desired number of pixels remaining after trimming. Thus, for a hole of large diameter, a number of NNW trim stages would be interspersed with a number of SSE trim stages.

Identification block 118 in FIG. 7 differs in structure from the aforementioned blocks. It identifies the position within the raster scan of the 1 or more pixels remaining after trimming It includes a counter which commences a count at the moment of initiation of the raster scan and is reset at the termination of the raster scan. Thus, it is able to identify the position of an isolated 1-bit pixel by saving its count when the pixel appears. The saved count may then be converted to a Cartesian coordinate XY address through table look-up or another acceptable conversion process.

The output from identification block 118 is fed to controller 62 for further processing. Each of the remaining tangent detectors (east, south and west) operate simultaneously, in parallel, with the north tangent detector and provide identified pixel outputs to controller 62.

Figure 9:
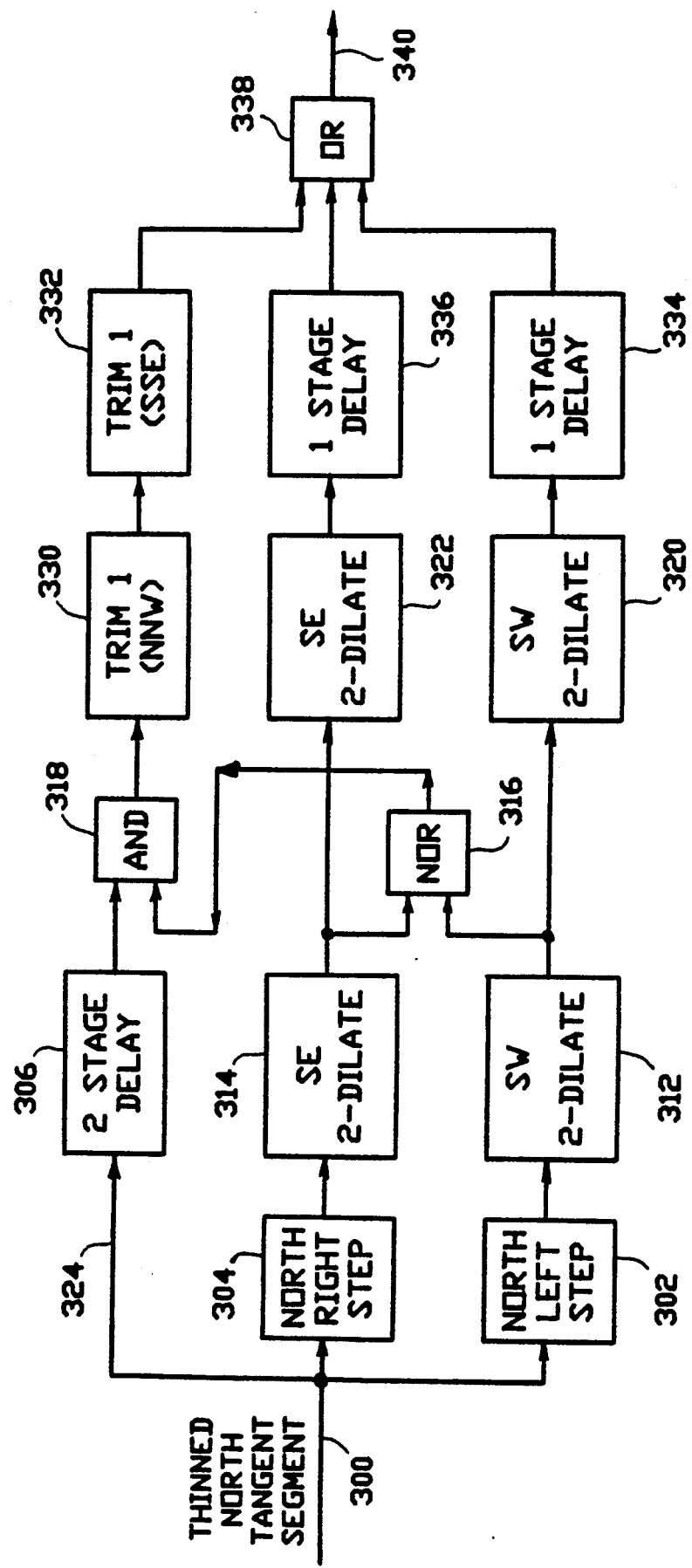
FIG. 9 is a block diagram of a portion of a second preferred embodiment of the invention.

Referring now to FIG. 9, a modified tangent detector is shown which enables a reduction in the number of trim stages and thereby enables tangent identification to occur more rapidly. The initial processing portions of the system are not shown as they are identical to those shown in FIG. 7. In brief, the hole input pixel stream is fed through a series of blocks identical to blocks 102, 104, 106, 108, 110 and 112. The resulting thinned tangent segment pixel stream is then applied, via conductor 300 to three parallel networks. Those networks identify the right and left shoulders of the tangent plateau and, additionally, provide a delayed tangent segment for subsequent comparison and masking purposes. The operation of FIG. 9 will be described in conjunction with the pixel scenes shown in FIGS. 10a–10g and further in conjunction with certain of the logic equations and templates shown in FIG. 13 et sequence. Furthermore, while FIG. 9 illustrates the application of various logic stages to the thinned north tangent segment, each of the other tangent segments, (i.e., south, east and west) are processed in a substantially similar manner, using the templates and logic functions which apply thereto.

Figure 10A:
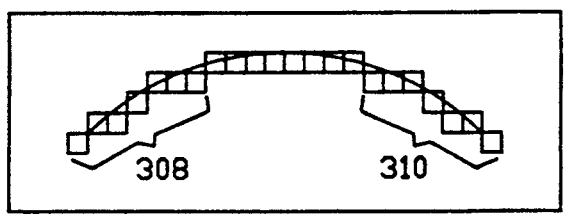
FIGS. 10a–10g are pixel images at various stages of the operation of the system of FIG. 9.
Figure 10B:
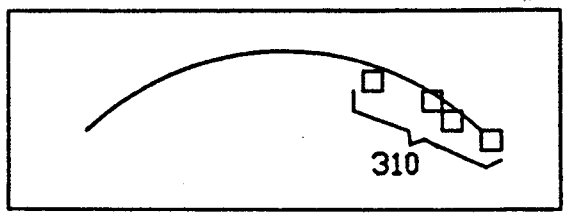
Figure 10C:
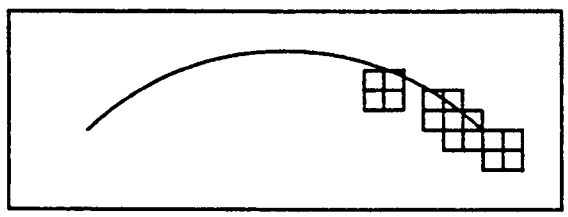
Figure 10D:
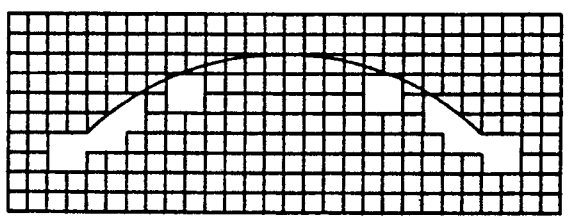

In summary, and in particular referring to FIGS. 9 and 10a to 10g, a thinned north tangent segment (see FIG. 10a) is simultaneously applied to north left step processing element 302, north right step processing element 304 and two stage delay element 306. It is the function of north left step processing element 302 and north right step processing element 304 to identify and isolate in their pixel stream outputs, left and right shoulder portions 308 and 310 of the pixel scene of FIG. 10a. Right shoulder portion 310, as it emanates from processing element 304, is shown in FIG. 10b. Left shoulder portion 308 is isolated by processing element 302 and provides a similar left shoulder pixel stream (not illustrated). Once shoulder portions are identified and isolated, they are applied to southwest and southeast dilation processing elements 312 and 314. Dilation elements 312 and 314 dilate both the isolated right and left step pixel streams, to 2×2 pixel matrices to fill in some of the gaps therebetween. This is illustrated in FIG. 10c for the north right step. Subsequently, the outputs from dilation elements 312 and 314 are applied to a NOR circuit 316 and subsequently to AND circuit 318. They are also simultaneously applied to two additional dilation circuits 320 and 322. The output of NOR circuit 316 is the pixel stream shown in FIG. 10d wherein all pixel positions which were previously in the 1 state have been converted to 0 the state and vice versa.

Figure 10E:
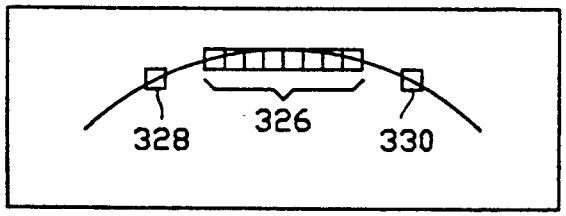
Figure 10F:
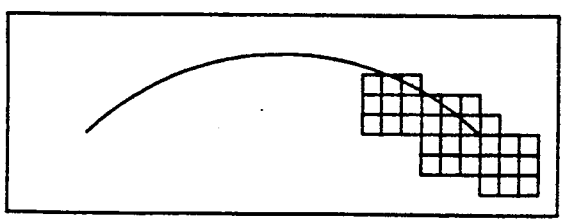

Simultaneously, the input, thinned north tangent pixel stream is applied via conductor 324 to 2-stage delay 306. 2-stage delay 306 is a series of two processing elements which delay the thinned north tangent pixel stream an equivalent amount of time to that consumed by the operations of the north left step and north right step identification networks. Thus, pixels making up the thinned north tangent scene shown in FIG. 10a are applied to AND circuit 318 synchronously along with the pixel image emanating from NOR circuit 316. From an examination of FIGS. 10a and 10d, it can be seen that the output of AND circuit 318 is as illustrated in FIG. 10e. More specifically, the AND function is satisfied only for bits appearing in plateau 326 and for several isolated right and left step bits 328 and 330. While not shown in FIG. 10e, it is also possible that lower lying plateaus can occur as a result of the AND operation. Thus, further processing is required to assure that plateau 326 is properly isolated.

As aforestated, pixel streams from southwest 2-dilate element 312 and southeast 2-dilate element 314 are applied to two additional dilation elements 320 and 322 respectively. The result is that the 2-dilations shown in FIG. 10c (and their mirror image, not shown) have additional dilation operations performed thereon resulting in the pixel scene shown in FIG. 10f (the left step dilation not being shown). The output from AND circuit 318 is applied through two trim processing elements 330 and 332 which act to remove the opposed end pixels from tangent pixel plateau 326 shown in FIG. 10e. Since pixels 328 and 330 stand alone, they are not removed, as trim elements 330 and 332 are restricted to removing pixels which are joined to another pixel.

Delay elements 334 and 336 are inserted for the purpose of synchronizing the outputs from dilation elements 320 and 322 with trim element 332. The resulting outputs are applied to OR circuit 338 whose pixel stream output is the scene shown in FIG. 10g. At this stage, it is to be noted that left and right shoulders 342 and 346 are now completely connected and tangent plateau 348 is isolated therefrom. The output appearing on line 340 is applied to the circuit shown in FIG. 11, in parallel with outputs from the other three tangent detection circuits.

Figure 11:
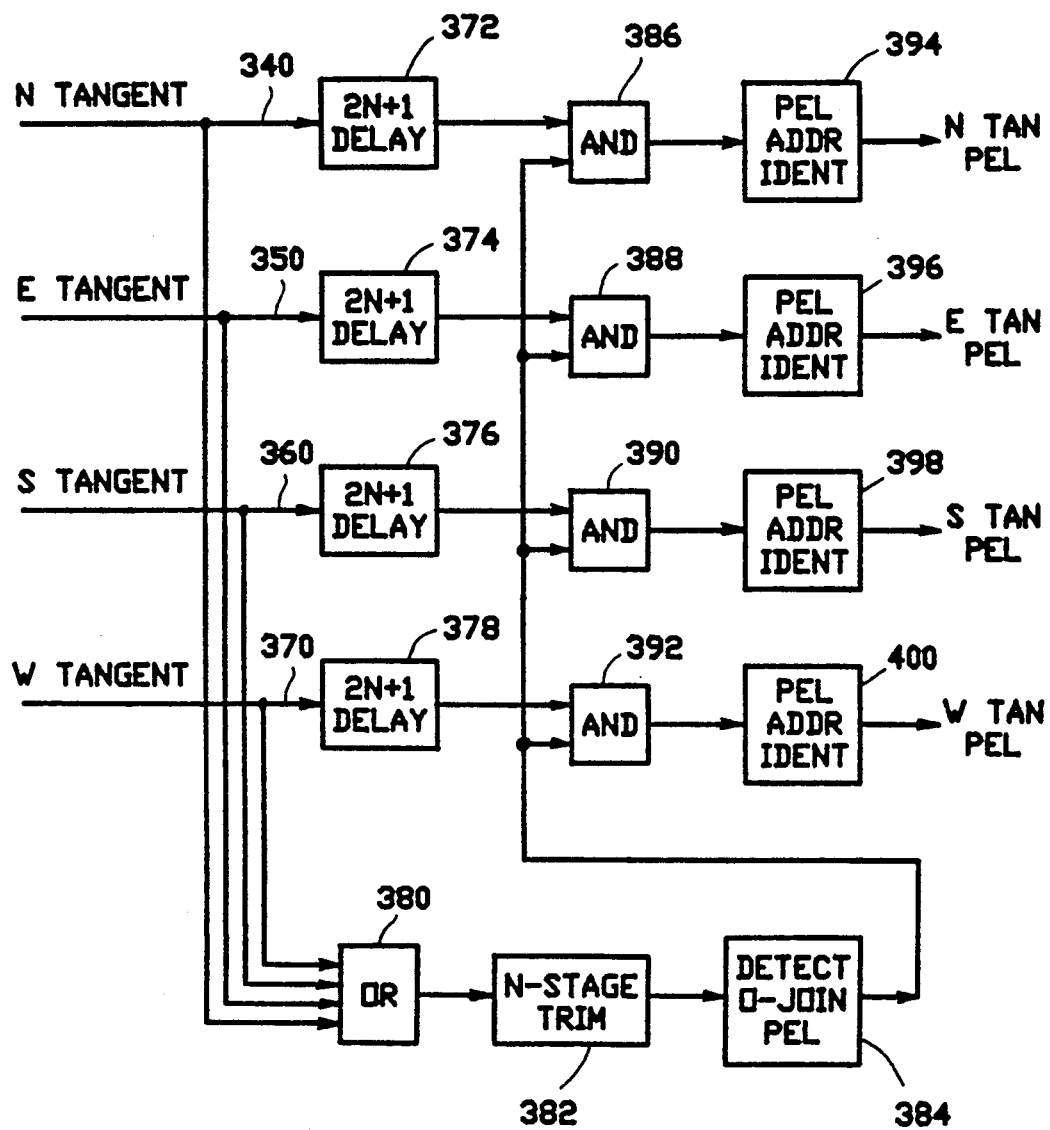
FIG. 11 is a block diagram of a system which identifies north, east, south and west tangent pixels from the image data generated by the embodiment of FIG. 9.

Prior to discussing the operation of the system shown in FIG. 11, logic equations and templates employed by the various processing elements shown in FIG. 9 will be considered. The logic equations and templates employed by north left step processing element 302 and north right step processing element 304 are shown in FIGS. 20a and 20b respectively. As can be seen from the two templates in FIG. 20a, the presence in an input neighborhood of center and north 1 bits and a 0 east bit; or center and northeast 1 bits and 0's in the north and east pixel positions, give rise to a 1 output from the processing element. Such an output indicates the presence, in the input neighborhood, of a vertical step or step rising from the southwest to the northeast —thus indicating a "north left step". Any other bit pattern passing through north left step processing element 302 is eliminated.

The north right step element 304 operates in a similar manner but in accordance with the equation and templates shown in FIG. 20b. Additionally, other, non-illustrated, south, west, and east step detection networks operate similarly, but in accordance with the equations and templates shown in FIGS. 20c, 20d, 20e, 20f, 20g and 20h. It should be noted with respect to the west and east step processing elements, that the concept of left and right steps is eliminated and, due to the fact that the east and west tangent plateaus are vertically oriented, the steps on either side thereof become the top and bottom steps.

Southwest 2-dilate processing element 312 and southeast 2-dilate processing element 314 employ the logic equations and templates shown in FIGS. 19a and 19b respectively. Thus, for example, southwest 2-dilate element 312 will provide a 1 output if its input neighborhood exhibits a 1 in one, or more of the center bit, east bit, northeast bit, or north bit. This results in an expansion of each 1 bit pixel to a neighborhood of 4 pixels, all of which are set to 1 and are oriented to the east, south and southeast direction from the original 1 bit pixel.

The northwest 2-dilate and northeast 2-dilate logic equations and templates of FIGS. 19 and 19d are employed in the operation of the south tangent segment detection circuit, whereas the east and west tangent detection circuits use combinations of the 2-dilate circuits, as appropriate. Each delay circuit (e.g., 2-stage delay 306 and 1-stage delay 336) implements the center bit identity equation and template shown in FIG. 18. Essentially, any such processing element repeats the incoming bit stream, delayed in time by the duration required for a processing element to operate on an input 8-neighborhood of pixels and is used for circuit synchronization.

Trim 1-join processing elements 330 and 332 employ equations and templates shown in FIGS. 16a and 16b that have been previously described with respect to the operation of the circuit of FIG. 7 and will not be further considered here.

Figure 10G:
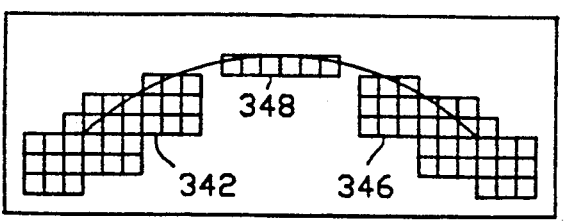

Turning now to FIG. 11, the inputs on lines 340, 350, 360 and 370 take the form of a pixel scene such as shown in FIG. 10g. The scene for each of the east, south, and west tangents are identical to the north tangent scene in FIG. 10g but they are oriented appropriately around azimuth lines which pass through the east, south, and west points of the via-hole image.

The aforementioned pixel stream inputs are applied to delay stages 372, 374, 376 and 378 respectively, and in parallel to OR circuit 380. The output of OR circuit 380 is a pixel image which includes 4 plateaus of pixels (e.g., see plateau 348 in FIG. 10g) and clusters of shoulder pixels associated therewith, but separated therefrom. This pixel scene then passes through N stage trim processing element 382 where the end pixels appended to each plateau are successively trimmed. It will be remembered that each trim stage actually includes two trim processing elements that operate from different ends of a line of pixels being trimmed. Of course, some pixels in shoulders may also be trimmed but that is ignored for the reason that the next processing element, (i.e., detect 0-join processing element 384) detects only pixels which are isolated and rejects everything else. Thus, the number of trim stages 382 is adjusted so as to eliminate all but one pixel from each tangent plateau and to pass that pixel to detection circuit 384.

Detection circuit 384 operates in the manner shown by the logic equation and template illustrated in FIG. 17. Thus, a 1 bit is generated in response to an input 8-neighborhood only when the center bit of the neighborhood is set to 1 and all other bits in the neighborhood are set to 0. This action eliminates all pixels which are in any way adjacent to another pixel and leaves only isolated tangent pixels.

It will be recalled that while each north, east, south and west tangents scene is applied, in parallel, to OR circuit 380, that they, in fact, arrive at different times, depending on their position in the scene and raster scan. Additionally, the pixel output of 0-join pixel element 384 is delayed by $2n+1$ stages as a result of the pixel stream's passage through trim element 382 and 0-join element 384. When the thus delayed, but detected 0 join pixels are applied to AND circuits 386, 388, 390 and 392, they are AND'ed with the outputs from $2n+1$ delay circuits 372, 374, 376 and 378 respectively. In each of the aforementioned AND circuits, the serially appearing tangent pixel elements are separated and appear on the respective outputs.

The outputs of AND circuits 386, 388, 390 and 392 are then applied to pixel address identification circuits 394, 396, 398 and 400 where the address of each identified and isolated tangent pixel is determined and provided to controller 62. When all pixels have been identified as to their address, controller 62 calculates the diameter of the via-hole, identifies its position vis-a-vis the other fixed points, and generally determine the characteristics of the via-hole.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

We claim:

1. A system for determining characteristics of a substantially rounded feature comprising:
   means for forming a raster-scan image of pixels representing said rounded feature;
   means for identifying groups of pixels from said raster-scan image of pixels, each said group including pixels clustered about an azimuth and lying on a line which is substantially tangent to a boundary of said rounded feature at an intersection of said azimuth and said boundary;
   means for trimming each said selected group of pixels to isolate pixels lying on said tangent line; and
   means for analyzing said characteristics of said rounded feature by determining relationships between said isolated pixels.

2. The invention as defined in claim 1 wherein, for each said selected group of pixels, means are provided to augment said group with other pixels to create a continuous contour of pixels about said feature boundary in the area of said chosen azimuth.

3. The invention as defined in claim 2 further comprising:
   means for reducing said continuous contour of pixels to a thinned group of pixels approximately overlapping said feature boundary, and applying said thinned group of pixels to said trimming means.

4. The invention as defined in claim 3 wherein said selecting means determines its selection of each said group of pixels in accordance with a sensed, predetermined neighborhood pattern of said pixels.

5. The invention as defined in claim 4 wherein the pixels comprising said raster-scan image pass serially through said selecting means, augmenting means, reducing means, and trimming means.

6. The invention as defined in claim 5 wherein said means for trimming reduces each said thinned group of pixels to a pixel adjoining an azimuth.

7. A system for determining characteristics of a substantially rounded feature comprising:
   means for forming a raster-scan image of pixels representing said rounded feature;
   means for detecting and identifying groups of pixels from said raster-scan image of pixels, each said group including pixels clustered about an azimuth and lying adjacent a line which is substantially tangent to a boundary of said rounded feature and further including shoulder pixels lying about said boundary and adjacent said tangent line pixels;
   means for isolating said shoulder pixels from said pixels on said tangent line;
   means for trimming each said group of tangent line pixels to identify a pixel adjacent a chosen azimuth; and
   means for analyzing said characteristics of said rounded feature by determining relationships between said identified pixels.

8. The invention as defined in claim 7 wherein said isolating means comprises:
   means for isolating shoulder pixels adjacent one side of said tangent line pixels;
   means for isolating shoulder pixels adjacent another side of said tangent line pixels; and
   means for removing said isolated shoulder pixels from each said selected group of pixels.

9. The invention as defined in claim 8 wherein said trimming means comprises:
   means for combining all said groups of tangent line pixels and trimming said combined groups to isolate pixels adjacent to said azimuths; and
   means responsive to said isolated pixels to gate a pixel onto a circuit line which line is identified with the azimuth on which said gated pixel lies.

10. The invention as defined in claim 9 further comprising:
   means responsive to each said gate means to identify the address of each said gated pixel.

* * * * *